G. W. WEBER.
SIFTER TOP CAN OR VESSEL.
APPLICATION FILED MAY 11, 1908.
933,507. Patented Sept. 7, 1909.
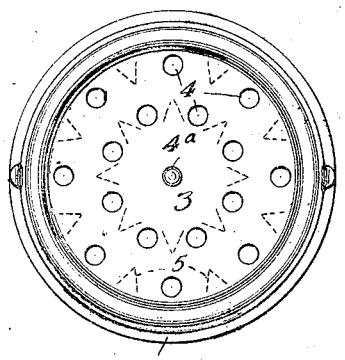
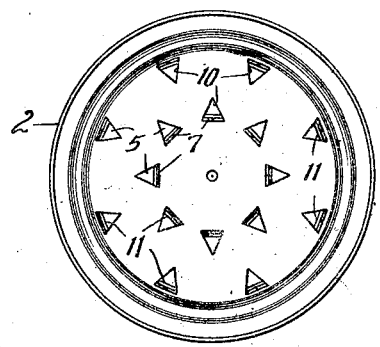
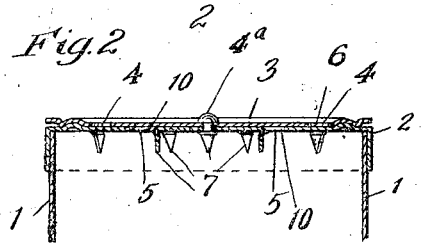
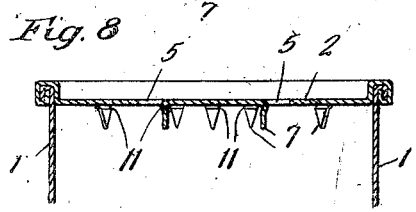
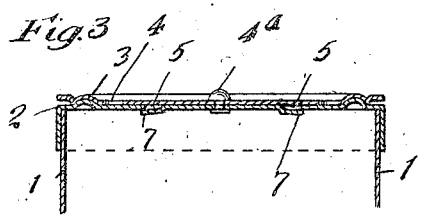
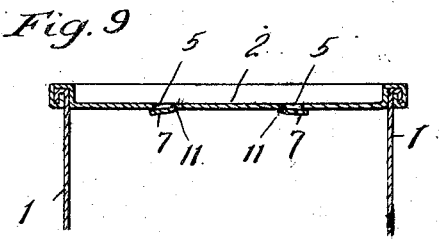
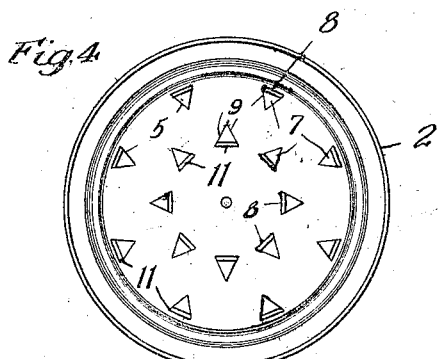
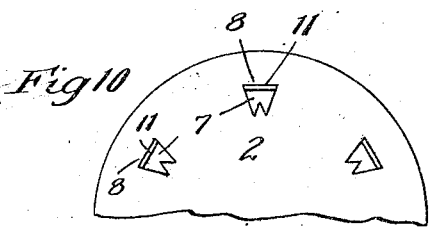
Witnesses:
Wm. Geiger
H. W. Munday
Inventor
George W. Weber
By Munday, Evarts, Adcock & Clarke
Attorneys

UNITED STATES PATENT OFFICE.

GEORGE W. WEBER, OF NEW YORK, N. Y., ASSIGNOR TO AMERICAN CAN COMPANY, OF NEW YORK, N. Y., A CORPORATION OF NEW JERSEY.

SIFTER-TOP CAN OR VESSEL.

933,507.

Specification of Letters Patent.   Patented Sept. 7, 1909.

Application filed May 11, 1908. Serial No. 432,036.

*To all whom it may concern:*

Be it known that I, GEORGE W. WEBER, a citizen of the United States, residing in New York, in the county of New York and State of New York, have invented a new and useful Improvement in Sifter-Top Cans or Vessels, of which the following is a specification.

My invention relates to sifter top cans or vessels.
Heretofore considerable difficulty and annoyance have been experienced with the ordinary construction of sifter top powder cans commonly in use, and having a perforated head or top and a rotary closing plate for closing the openings or perforations in said head or top by reason of the perforations becoming stopped or clogged up, especially in warm moist weather when the powder is liable to become a little damp.
The object of my invention is to provide a sifter top can or vessel having a perforated top and a rotary closing plate for closing the perforations in the said top, and by which the difficulties heretofore experienced from the perforations in the top becoming clogged up with the powder or other material in the can will be practically obviated, and this without increasing the cost of manufacture.

A further object is to provide a sifter top can or vessel having a perforated top through which the contents may be sifted out, and having means for preventing the perforations therein from becoming clogged or stopped up, and in which the means for preventing the clogging of the sifter perforations may also serve as closures for such perforations, and thus enable the separate rotary closing plate or other separate closing device to be dispensed with.
A further object is to provide a simple and practical construction of sifter top can having sifter perforations in its top and in which the number of operative sifter perforations in the top head may be regulated as desired by the user, according as a greater or less number may be required for any particular purpose.

The invention consists in a sifter top can, the perforated top or head of which has the customary smooth, regular upper face to receive the perforated rotary closing plate snugly thereagainst as required to enable said closing plate to effect a powder-tight closure of the holes or openings in said top, and which is provided on its inner face with a series of integral burs, lips, or projections at the sifter perforations or openings therein which serve as disintegrators for the powder and effectually prevent the perforations or openings from stopping up or clogging.

In the accompanying drawing forming a part of this specification, Figure 1 is a plan view of a sifter top can embodying my invention. Fig. 2 is a central vertical section showing the integral lips, burs or projections open. Fig. 3 is a similar view showing them closed. Fig. 4 is a detail bottom view of the perforated top head showing the disintegrator lips, burs or projections closed. Fig. 5 is a similar view showing them open. Fig. 6 is a detail section centrally through one of the sifter perforations and integral disintegrator lip for closing the same. Fig. 7 is a section on line 7—7 of Fig. 6. Figs. 8 and 9 are sectional views illustrating a modification in which the rotary closing plate is omitted. Fig. 10 is a detail plan view illustrating a modified shape of the disintegrator lips, burs or projections.

In the drawing, 1 represents the body of a sifter top can, 2 the perforated top head, 3 the perforated rotary closing plate and 4ᵃ the pivotal connection between the closing plate 3 and the top head 2. The head 2 may be secured to the body 1 at the end thereof in any suitable manner and may be either permanently or removably secured, as may be desired.

The rotary closing plate 3 has a series of sifter perforations 4, preferably round or circular, and which by turning the plate are adapted to alternately close or register with and thus open the sifter perforations 5 in the top head 2.

The perforated top head 2 has a smooth or regular upper face 6, so that the rotary closing plate 3 may fit closely and snugly thereagainst and thus tightly close the perforations 5 in the top head. The perforated top head 2 is provided on its inner side or face with a series of integral burs, lips, disintegrators or sharp projections 7 at or adjacent to the sifter perforations 5, and preferably formed from the stock or material displaced but not cut out by the punches in forming the openings or perforations 5 in the top head. The perforations 5 in the top head may be of any desirable shape or outline, but I prefer to make them of an angular outline, as I thereby produce sharper and longer burs or projections 7 on the inner side, and thus more effectively operating disintegrators.

The lips, burs, projections or points 7 are integrally united at one edge 8 with the top head from which they are formed, and are adapted, after being formed, to be again straightened out substantially flat with the top head so as to close the perforations 5 from which they were punched. The points, burs or projections 7 preferably have two straight edges 9 which are entirely cut through in the act of forming them. After or at the same time that they are formed, the disintegrator lips, points or projections 7 are preferably flattened out or slightly enlarged at one or more points 11 so that their edges 9 at such point or points 11 will slightly overlap the cut edges 10 of the opening 5, and thus prevent said projections or points 7 from being entirely again shut within the opening from which they were displaced when they are again closed down flat with the top head to close the openings 5 therein. This will be readily understood from Fig. 5 of the drawing.

By straightening out or bending down the disintegrator projections or points 7 flat against the top head, the same will serve as an effective closure for the sifter perforations 5 in the top head and thus render unnecessary a separate piece closure therefor, such as the rotary closing plate 3. In cases where the rotary closing plate 3 or other separate piece closure is used, the lip, burs or points 7 may also be used as a further closure for the perforations, as illustrated in Fig. 3 of the drawing; or if preferred, in cases where the rotary closing plate 3 is used, the points 7 may be left permanently projecting inward.

While I prefer to make the disintegrator lips, points or projections 7 of an angular shape with two cut sides or edges and one remaining uncut edge to hinge the point or projection integrally to the top head, as illustrated in Figs. 1 to 9, the same may be made of any desired shape or outline, having one uncut side or edge to unite it integrally with the top head. In Fig. 10 I have shown one such other shape.

In the drawing, for clearness of illustration, I have exaggerated the size of the perforations, 4, 5. I desire it to be understood that these perforations may be made of any desired size and number, according to the particular use or material for which the box or can is intended.

To facilitate the bending of the lips or projections 7 from their closed to their open positions and vice versa, and to cause the same to bend squarely and truly across, I prefer to provide the same with a bead 11 at their hinge or uniting edge or side 8. This bead also serves to slightly elongate the lip 7 and cause it to overlap the cut edge of the opening, and thus prevent its shutting or closing flush and flat into the opening 5 from which said lip was cut or displaced.

I claim:—

1. A sifter container having sifter openings therein each formed by a plurality of converging slits extending from an uncut edge or base, and integral bendable disintegrator lips formed by said slits and extending each from said uncut edge or base, said lips having each a plurality of cut edges extending convergingly from its uncut edge or base, and said lips being each elongated from its uncut edge or base toward the converging slit edges of the opening from which it is cut, to cause the cut edges of the lip to slightly overlap the cut edges of the opening and produce a powder tight closure thereof when the lip is flattened or straightened back, substantially as specified.

2. A sifter container having a sifter opening formed by a plurality of converging cut edges extending from an uncut edge, and an integral lip having a plurality of converging cut edges extending from said uncut edge of said opening, said lip being elongated to cause its cut edges to slightly overlap the cut edges of the opening when it is flattened and straightened back and produce a tight closure, substantially as specified.

3. A sifter container having a sifter opening formed by a plurality of converging cut edges extending from an uncut edge, and an integral lip having a plurality of converging cut edges extending from said uncut edge of said opening, said lip being elongated to cause its cut edges to slightly overlap the cut edges of the opening when it is flattened and straightened back and produce a tight closure, the cut edges of said lip converging to a point to cause the lip to also serve as a disintegrator when opened out at an angle, substantially as specified.

GEORGE W. WEBER.

Witnesses:
 L. A. WELLES,
 W. P. PALMER.